(12) United States Patent
Orehawa

(10) Patent No.: US 9,137,274 B2
(45) Date of Patent: Sep. 15, 2015

(54) METHOD AND SYSTEM FOR COMMUNICATING BETWEEN DEVICES

(71) Applicant: Control Techniques Limited, Newtown (GB)

(72) Inventor: Luke Duane Orehawa, Newtown (GB)

(73) Assignee: CONTROL TECHNIQUES LIMITED, Newtown (GB)

( * ) Notice: Subject to any disclaimer, the term of this patent is extended or adjusted under 35 U.S.C. 154(b) by 211 days.

(21) Appl. No.: 13/902,361

(22) Filed: May 24, 2013

(65) Prior Publication Data

US 2013/0332529 A1    Dec. 12, 2013

(30) Foreign Application Priority Data

May 25, 2012 (GB) .................................. 1209266.4

(51) Int. Cl.
*H04L 29/06* (2006.01)
*G06F 13/00* (2006.01)

(52) U.S. Cl.
CPC .............. *H04L 65/403* (2013.01); *G06F 13/00* (2013.01); *H04L 69/28* (2013.01)

(58) Field of Classification Search
CPC ................................................... H04L 65/403
USPC .......................................... 709/204/205/206
See application file for complete search history.

(56) References Cited

U.S. PATENT DOCUMENTS 6,070,246 A * 5/2000 Beser ................................ 726/2
2007/0287425 A1* 12/2007 Bates ......................... 455/412.1

FOREIGN PATENT DOCUMENTS

EP         0910189        12/2002
GB         2426164        11/2006
WO      2012/026935        3/2012

OTHER PUBLICATIONS

"Smart Transmission Grid: Vision and Framework", Li et al, IEEE, vol. 1, No. 2, Sep. 2010 http://web.eecs.utk.edu/~fli6/Publications/FLi10JPa.pdf.*

* cited by examiner

*Primary Examiner* — Randy Scott
(74) *Attorney, Agent, or Firm* — Harness, Dickey & Pierce, P.L.C.

(57) ABSTRACT

A network communication method is provided, said network comprising first and second nodes. The method comprises: transmitting a message from the first node to the second node, wherein the message comprises a data content portion and an identifying portion, wherein said identifying portion includes a first unique identifier corresponding to a time source which controls a time value at the first node; receiving the transmitted message at the second node; comparing the first unique identifier to a second unique identifier, wherein said second unique identifier corresponds to a time source which controls a time value at the second node; and if the result of said comparison is positive, accepting the message for processing at the second node.

22 Claims, 9 Drawing Sheets

Figure 2a

| Value | Description |
|---|---|
| 0x01 | Destination - Intercept |
| 0x02 | Source – Default Route |
| 0x02 | Source – Slot 2 |
| 0x00 | Transaction ID |
| 0x00 | Response Status = OK |
| 0x00 | *Reserved* |
| 0x70 | CyclicFrame Response |
| 0x00 | End of Ops |
| 0x07 | Cyclic Link Number – 7 |
| 0x00 | Alignment – 0 |
| 0x00 | Scheme – Immediate Use |
| 0x## | Data 0 |
| 0x## | : |
| 0x## | : |
| 0x## | : |
| 0x## | : |
| 0x## | Data n |

Figure 2b

| | |
|---|---|
| 0x01 | Destination - Intercept |
| 0x02 | Source – Default Route |
| 0x02 | Source – Slot 2 |
| 0x00 | Transaction ID |
| 0x00 | Response Status = OK |
| 0x00 | *Reserved* |
| 0x70 | CyclicFrame Response |
| 0x00 | End of Ops |
| 0x07 | Cyclic Link Number – 7 |
| 0x00 | Alignment – 0 |
| 0x01 | Scheme – Synchronised |
| 0x00 | |
| 0x0D | |
| 0x1E | |
| 0xFF | Grandmaster EUI-64 |
| 0xFE | 00-0D-1E-FF-FE-34-56-78 |
| 0x34 | |
| 0x56 | |
| 0x78 | |
| 0x00 | |
| 0x56 | Seconds = 5698532 from epoch |
| 0xF3 | (65d, 22h, 55m, 32s) |
| 0xE4 | |
| 0x02 | |
| 0x75 | Nanoseconds = 41250000 |
| 0x6C | |
| 0xD0 | |
| 0x## | Data 0 |
| 0x## | : |
| 0x## | : |
| 0x## | : |
| 0x## | : |
| 0x## | Data n |

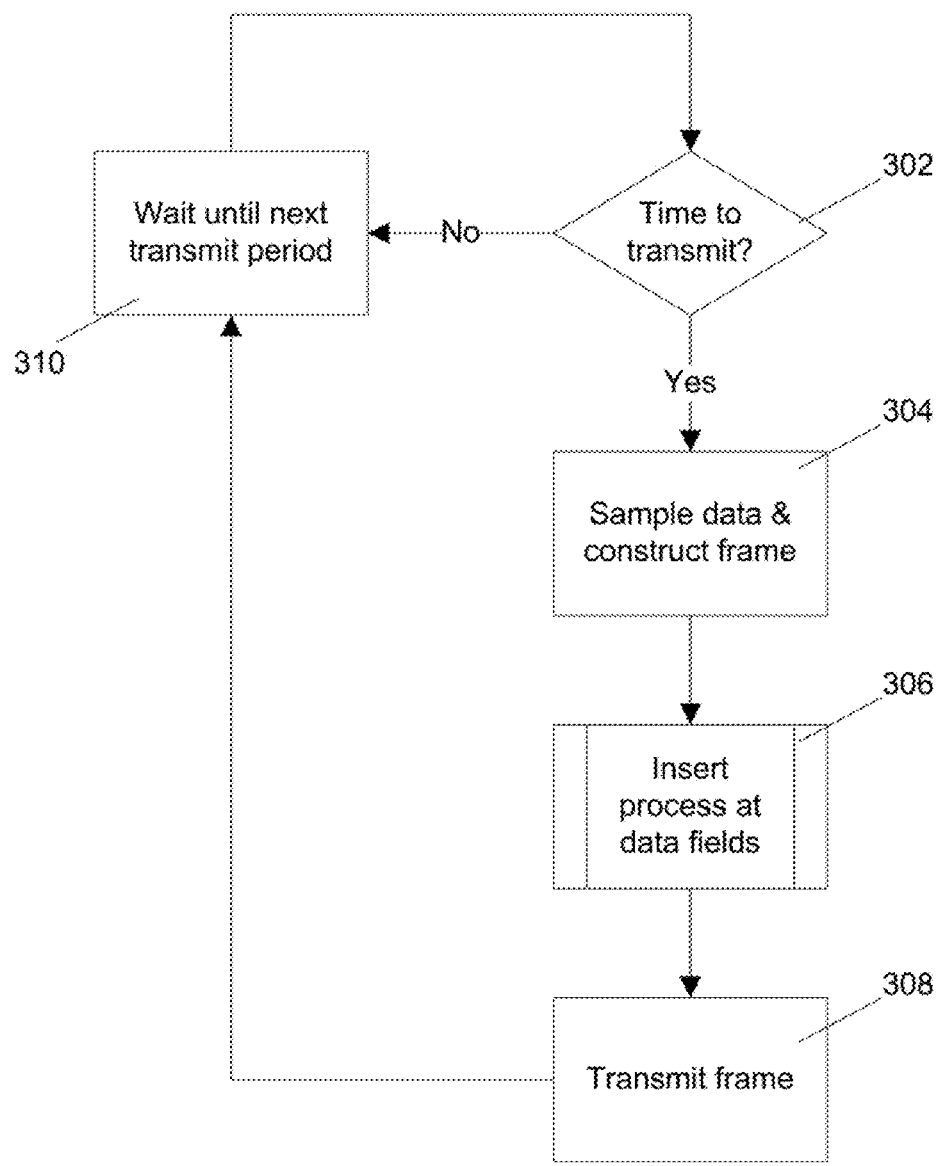

METHOD AND SYSTEM FOR COMMUNICATING BETWEEN DEVICES

CROSS-REFERENCE TO RELATED APPLICATION

This application claims the benefit and priority of Great Britain Patent Application No. 1209266.4 filed May 25, 2012. The entire disclosure of the above application is incorporated herein by reference.

FIELD

The invention relates to a method and system for communicating between nodes on a network, for example between a drive and a controller.

BACKGROUND

Inverters are well known devices. In general, they are used to convert electrical energy from one form to another. For example, an inverter can use a DC electrical input, such as from a solar array, and provide an AC electrical output. Inverters can also have an AC input. For example, they can be used to output AC electricity at a fixed frequency from a variable frequency AC input. An inverter can be used as a "drive" (also known as a "drive unit") for controlling operation of motors in a range of different systems. A variety of inverter drive products is available from Control Techniques Ltd, of The Gro, Pool Road, Newtown, Powys, SY16 3BE.

It is also well known to have a system or network wherein multiple devices are connected together in order to communicate with one another. For example a network may comprise a plurality of inverter drive devices. Additionally such a network may comprise a central controller for communicating with each of the other devices on the network.

In order for communications between network nodes, for example communications between two drive devices on the network and/or between a single device and a controller, to be successful, some agreement between the communicating nodes with respect to time is generally required. For example, if a communicated message from one node to another includes an instruction for the receiving node to take a particular action, such as driving a motor at a particular speed at a specified time, it is important that the receiving node has the same understanding of when that specified time will occur as the transmitting node does. If this common understanding is not present, the receiving node will not be in a position to sensibly and accurately action the message in the manner in which the transmitting node intended.

There are many known approaches for networking devices and for attempting to establish an agreement on time between network devices. Known protocols for networking devices include token ring, ARCnet and Ethernet. These protocols and others will be well known to the skilled reader. Each protocol type generally has advantages and disadvantages. For example, certain types of protocol are better suited to networks wherein a single central controller must communicate the same information to a plurality of nodes on the network. Others are better suited to networks in which individual messages are to be communicated to individual respective receiving nodes.

SUMMARY

An invention is set out in the claims.

According to an aspect, a network communication method is provided, said network comprising first and second nodes. The method comprises transmitting a message from the first node to the second node, wherein the message comprises a data content portion and an identifying portion, wherein said identifying portion includes a first unique identifier corresponding to a time source which controls a time value at the first node. The method further comprises receiving the transmitted message at the second node and comparing the first unique identifier to a second unique identifier, wherein said second unique identifier corresponds to a time source which controls a time value at the second node. The method further comprises, if the result of said comparison is positive, accepting the message for processing at the second node. The comparison may be carried out at the second node or at another location and the outcome conveyed to the second node. If the result of the comparison is negative, the second node may discard the message.

The first node and/or the second node may be synchronised to the respective time source which controls its time value. That synchronisation may be deemed to exist if a reference time used at the respective node matches a corresponding reference time at its time source to within a predetermined tolerance limit.

The first and second nodes may form part of a networked system, wherein said first unique identifier and/or said second unique identifier is unique within said networked system. Additionally, the first unique identifier and/or said second unique identifier may be a globally unique identifier.

The result of the comparison may be deemed to be positive if the first unique identifier is found to be identical to the second unique identifier, for example the two identifiers match one another to within a predetermined threshold.

The step of accepting the message for processing at the second node may include placing the message in a buffer for future processing or processing the message immediately once the result of the comparison has been deemed to be positive. If the second node comprises a device having a repeating update period, the message may be processed at the second node at the beginning of a new update period or at a predetermined time after the beginning of a new update period.

The transmitted message preferably determines when the second node should process the message. For example, the message may include a processing instruction, wherein said processing instruction includes an indication of a processing time at which the second node should process the message if the result of the comparison is positive. If the second node comprises a device having a repeating update period, the indication of a processing time at which the second node should process the message may comprise a time interval from the beginning of an update period. That time interval may be zero.

The data content portion of the message may include a sampling indication, said sampling indication comprising a time at which sampled data within the data content portion was obtained. For example, the sampled data may have been obtained by any of: a sensor, a logging device, or a processor. The method may include using the sampling indication—which may be a "sampled at" time—to obtain a data value for use by the second node using one of: interpolation or extrapolation. That data value could be any of: a speed; a position, a time interval, an electrical measurement such as a current or voltage; a phase or frequency of an electrical signal; or any other suitable data value. The data value preferably relates to a system to which the second node is connected or in which it is comprised. For example, the second node may comprise a drive device that controls operation of a motor, and the data value may comprise a target operational value for the motor.

The first and/or the second node may comprise any of: a drive, a controller, an inverter, or any other device that can form part of a networked system.

The first and second nodes may communicate with one another using an Ethernet-based protocol. For example, the Ethernet carrier may be TCP or UDP or any other suitable carrier.

The first and second nodes may communicate with one another using any of: a wired connection, a wireless connection, or Bluetooth.

The first unique identifier and/or the second unique identifier may comprise a unique network address for a device having a local clock, wherein said local clock comprises the time source which controls a time value at the respective node. For example, the first unique identifier and/or the second unique identifier may comprise an IEEE EUI-64 address.

The time source which controls a time value at the first node and/or the time source which controls a time value at the second node may comprise a local clock at the first node or a local clock at the second node. Alternatively, the network may comprise a third node (and may also comprise yet further nodes) and the time source which controls a time value at the first node and/or the time source which controls a time value at the second node may comprise a local clock at the third node. The third node may have a third unique identifier associated therewith, wherein said third unique identifier corresponds to a time source which controls a time value at the third node, and wherein said third unique identifier is different to the first unique identifier and/or to the second unique identifier. Therefore there is no need for there to be a positive comparison between unique identifiers for all nodes on the network in order for a message from a first node to be accepted for processing by a second node.

The step of processing the message may comprise copying data from the data content portion of the message to one or more data destinations at the second node or may comprise any other suitable processing step(s).

According to an aspect, a method is provided of generating a message for transmission by a node on a network, the method comprising providing a data content portion for the message and providing an identifying portion for the message, wherein said identifying portion includes a first unique identifier corresponding to a time source which controls a time value at the first node. Before the data content portion is constructed, it may be determined whether the current time corresponds to a time at which the corresponding node should transmit a message. The method may further comprise providing a sampling indication for the message, said sampling indication comprising a time at which sampled data within the data content portion was obtained.

According to an aspect, a method is provided of verifying a message received from a first node by a second node on a network, wherein said message comprises a data content portion and an identifying portion, said identifying portion including a first unique identifier corresponding to a time source which controls a time value at the first node. The method comprises, upon receipt of the message at the second node, comparing the first unique identifier to a second unique identifier, wherein said second unique identifier corresponds to a time source which controls a time value at the second node and, if the result of said comparison is positive, accepting the message for processing at the second node.

According to an aspect a device is provided, said device being arranged to communicate with one or more other devices on a network, wherein said device is configured to operate as a first node or as a second node on the network, as described herein. A network may be provided, said network comprising a plurality of such devices configured for communication with one another.

FIGURES

Embodiments and examples will now be described with reference to the figures of which:

FIG. 2a shows an example of a non-synchronised cyclic frame;

FIG. 2b shows an example of a synchronised cyclic frame;

FIG. 3 shows a flow diagram for transmitting a cyclic data frame;

OVERVIEW

Figure 1:
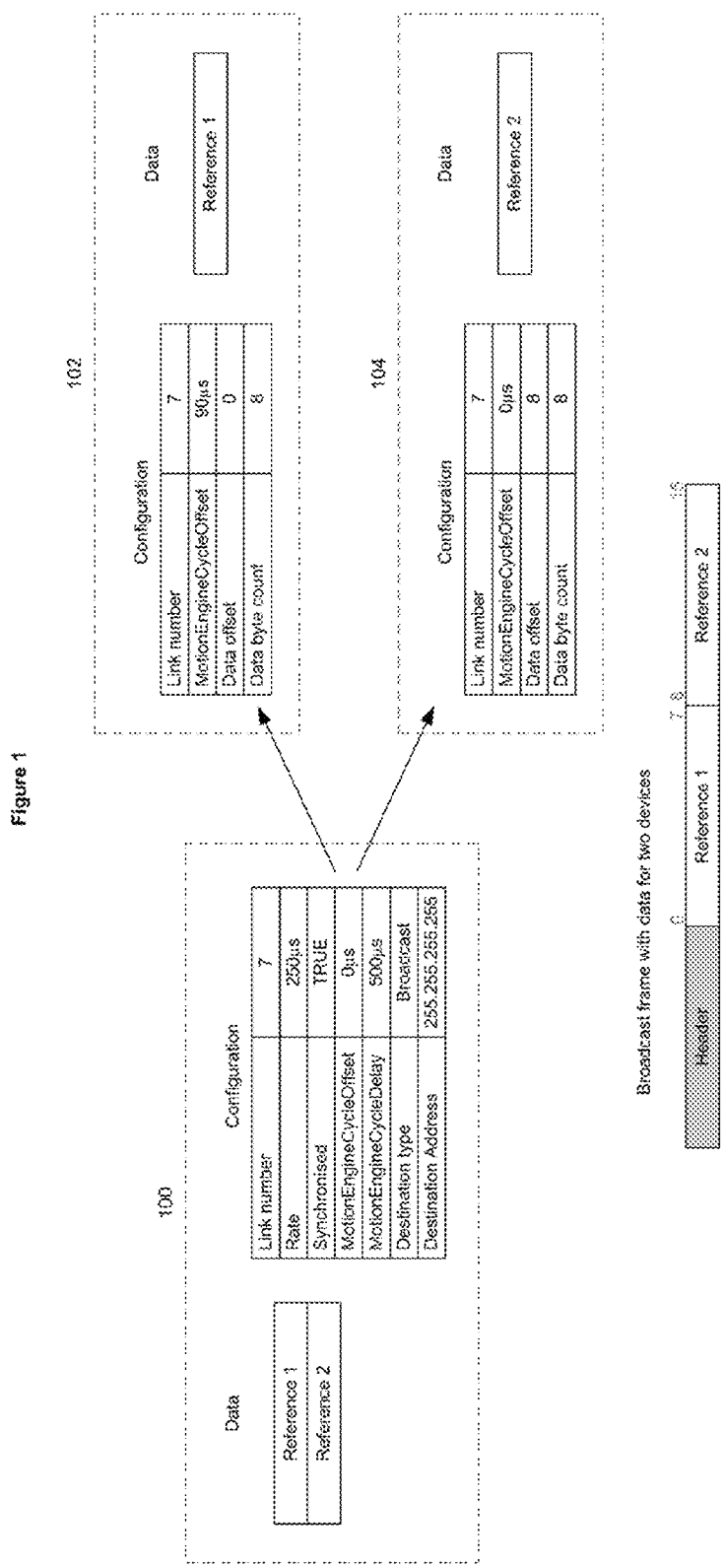
FIG. 1 shows an example of a network having a controller and two drive devices.

In overview a drive (or "drive unit") device is provided which can be used for controlling the operation of a motor. The motor can be part of any suitable system. For example it may be a motor for a conveyor belt in an industrial manufacturing environment. Alternatively it may be a motor for driving operation of a lift, hoist or crane. In general, the drive device is used to change the frequency and/or voltage of electrical power input to the drive, and to output electrical power in a suitable form and at suitable times in order to accurately and reliably control the operation and speed of the motor connected thereto.

Preferably, the drive device includes control and communication capability such that any two such devices that are connected on the same network can communicate with one another, and need not communicate via a central controller. Therefore in some situations the drive device may be implemented on a network that does not include a central controller. Each drive device may have a network interface and PLC programmability. This allows for a distributed intelligence rather than the traditional centralised intelligence implemented in known networks.

Any suitable protocol may be used for controlling communications between the devices on a network. For example Ethernet protocol may be used.

Any suitable protocol may be used to determine the format of messages communicated on the network. For example the IEEE 1588 message format, which includes time represented by a 32 bit seconds value and 32 bit nanoseconds value of the grandmaster clock since its epoc, may be used. The epoc may be a real world time. For example, as the skilled reader will appreciate, conventional systems often used 1 Jan. 1970 as the grandmaster clock epoc. However the epoc may be any other suitable time and does not have to be a real world time. Instead, for example, the time at which a particular device became the grandmaster clock may be regarded as the epoc and the time representation in the communicated messages on the network can be defined relative to that epoc. Therefore there is no need for the devices to include expensive equipment for measuring or recording real world time.

When the Ethernet protocol is used for communication between the devices on a network, the IEEE protocol can be used to ensure that communicating devices on a network share a common concept of time. However, there is no obligation for all devices or nodes on the network to be fully synchronised with one another or to share a single common understanding of time. Instead, it is important that two individual devices or nodes that communicate with one another agree on a time or time frame. The agreed time frame may not be a real world time however it is possible for the agreed time to accurately reflect the real world time through use of GPS or internet, which can obtain accurate real time from, for example, atomic clocks.

Whether a particular device can communicate with a particular other device or node on the network may be configured through initial device set up and/or by a PLC programme written by the user installed in the device. After the initial configuration of the device(s) on a network has been completed, when a first (transmitting) device on the network wishes to communicate with a second (receiving) device it transmits a message to the receiving device wherein that message includes an indication of the time source to which the transmitting device is synchronised. For example, it can include a globally unique identifier (IEEE EUI-64 address) of the IEEE 1588 time source to which the transmitting device is synchronised. The receiving device can preferably receive the transmitted message at any time, wherein that receiving step comprises the receiving device at least seeing that the message is present and also being able to read the information regarding the time source associated with that message. However, before the receiving device will accept the message for processing or actioning, it will check that it is also synchronised to the same time source. If the receiving device is not synchronised to the same time source as the transmitting device, it will not accept the message for processing at that time.

Once a receiving device has verified that it is synchronised to the same time source as the transmitting device is, it will accept the received message for processing. The content of the message will vary dependent on various factors such as the exact nature of the particular devices involved, the network set up, and the actions that are required at any given time. In general, the message will preferably include a "process at" time which is an indication of a time at which the content of that message should be processed or actioned. If the receiving device determines that this "process at" time has not yet occurred, it may store the message, for example in a buffer, until the "process at" time occurs, at which time it will then take the relevant action as determined by the message. If it determines that the "process at" time has already passed, it may discard the message, process it immediately, as a late action or trigger an event to be handled by a PLC programme.

Generally speaking, the messages transmitted between the devices, or between one such device and a controller, may comprise parameter data such as data obtained from one or more sensors. Alternatively or additionally the message content may comprise data on a parameter value to be achieved, for example a motor speed that the receiving drive should be operated to attain. When the message contains information regarding information that has been sampled for example from sensors, the message can include a "sampled at" time indication. This will enable the receiving device to know when the content of the message was generated, as well as knowing when it should be actioned, as discussed above. This "sampled at" time indication may furthermore be used by the receiving device for extrapolation and/or interpolation purposes, so that it can construct a picture of multiple values at a specific moment in time.

Because the transmitting device will transmit a unique identifier with respect to its time source, such as the globally unique identifier required by the IEEE protocol, the receiving device will be able to quickly and accurately determine whether it is synchronised to the same time source as the transmitting device is. Therefore the receiving device will be able to quickly and accurately decide whether or not the received message should be accepted for processing. This overcomes a fundamental problem that is known to exist with respect to reliability of certain communication protocols, such as Ethernet. As the skilled reader will know, IEEE 1588 can be configured in several permutations which are incompatible with each other. All devices wishing to use the same IEEE 1588 grandmaster master clock must have matching settings. It is possible, and in some set-ups likely, that within a single network there will be a plurality of IEEE 1588 grandmasters configured with different settings. By ensuring that the transmitting device uniquely identifies the time source to which it is synchronised and the receiving device checks that unique identification and ensures that it is synchronised to the same time source before processing the message, any potential problems that may occur when data is exchanged between devices whose grandmasters are not the same are avoided.

The communication method and system described herein can ensure that the transmitting device will provide for a minimum time period between the time at which it transmits a message and the time at which it requires the receiving device to process or action the content of that message. Therefore the transmitting device allows the receiving device sufficient time to process the time stamp or other unique identifier in order to determine whether it can indeed accept and action the message from the transmitting device.

When multiple drive devices are networked together, they may be configured to choose one device as a master device that can act as a central controller for the network. The user may manipulate properties of one or more devices on a network during a configuration or set up stage in order to influence which drive device(s) may or may not be selected as the master device during operation of the system and whether priority should be given to the "master" role for any particular device. A suitable scheme such as the IEEE 1588 best master clock (BMC) algorithm can then be used to determine the time grandmaster. Additionally or alternatively, a user can write a PLC program on a drive device, wherein the same PLC program is used on each of a plurality of networked drives. Configuration settings can then be used to determine the sequential priority for each drive device becoming the controller on the network, to provide redundant distributed control.

The time as defined on the local clock comprised within the designated master device can be the time to which one or more other devices synchronise themselves. In general, it should not matter which device is chosen as the master device for controlling the network, or which device's local clock is used as a time grandmaster by any particular other device. As long as a transmitting device transmits a unique ID to identify what it regards as being its time grandmaster, a receiving device can accept and process messages from that transmitting device as long as that receiving device agrees on the same time grandmaster.

If Ethernet is used as the protocol for communicating between networked devices, any suitable type of Ethernet protocol may be implemented. For example the devices may communicate in accordance with the transport control protocol (TCP) or using user datagram protocol (UDP). Preferably UDP is used.

DETAILED DESCRIPTION

A system is provided comprising one or more drive devices on a communications network. A controller is also provided on the network for communication with the drive devices. The controller may itself be a drive device or it may be a distinct control means. For example the controller may be a computer such as a laptop or PC or any suitable industrial controller.

FIG. 1 shows an example of the network including a controller 100 and first 102 and second 104 drive devices.

Data is transferred between nodes of a network (i.e. between the controller 100 and the devices 102, 104 and/or between the first 102 and second 104 devices) via a cyclic link. A single cyclic link may be used to transfer data between more than one node on the network using broadcast or multicast messaging. However not all devices must use all the data provided on a single link.

Preferably the communications on the network are transferred via a synchronised cyclic link which specifies exactly when data in a message should be sampled and used by a receiving device. This synchronisation is based on an agreement between the transmitting and receiving nodes on a common clock value, as discussed in more detail below.

According to an embodiment, one or more of the drive devices 102, 104 on the network has a user input interface which enables the user to provide programmable input to that local device in order to configure its operation. For example the user may configure a particular drive device to act as a master controller for the network, particularly if a separate central controller such as the controller 100 shown in FIG. 1 herein is not provided. The user configuration can enable every drive device on the network to learn which device has been nominated as the master controller. Furthermore, it can enable the devices to learn if the designated master controller has been switched off or has otherwise become non-operational, in which case the other devices may agree on a new master controller. For example, a PLC program may be written to a drive device for the purpose of determining if it is operational. Furthermore, a PLC program or a conventional scheme can be used to select which device should be the master controller for the network at a particular time.

Data is shared between the nodes of the network. Generally speaking, for any individual message communicated on the network, one device or node will be configured to act as a data producer, wherein it will sample source data in order to produce data for the message. The receiving devices or nodes are then configured to be data consumers, extracting the data they are interested in from the cyclic link.

The data producer will usually be configured to sample its source data at a defined time in its motion engine cycle. The concept of a motion engine cycle will be known to the skilled reader. A motion engine cycle is defined per device and is a period of time during which that device will accept inputs, process those inputs (for example making any necessary calculations) and produce outputs as a result of that processing. It is known for devices to employ linear processing within each motion engine cycle, wherein data must be accepted as an input before it is processed and before an output is produced. When a first motion engine cycle ends, the next one begins. According to an embodiment, the first 102 and second 104 drive devices in the network shown in FIG. 1 are each configured to have a motion engine cycle length of 250 microseconds. However any suitable motion engine cycle length may be employed.

The controller 100 in FIG. 1 is set up to have first and second data references. Reference 1 data is intended for the first drive device 102 and reference 2 data is intended for the second drive device 104. There may also be some overlap data. For example, there may be common command data that is pertinent to both drive devices 102, 104 as well as device specific data contained within the respective references. By including reference 1 and reference 2 in the message header, the controller is able to optimise its settings by combining data for two different devices in a single message. The controller can operate efficiently, for example broadcasting its messages to all devices on the network periodically, and the use of the references within each message header will enable the first drive device 102 to pick up and look at the reference 1 data and the second drive device 104 to pick up and look at the reference 2 data.

The controller 100 is configured to sample and transmit data periodically, in this case every 250 microseconds. In order for each of the drive devices 102, 104 to be able to receive data transmitted by the controller 100, verify that there is an agreement on time source between itself and the controller 100 (as described in more detail below) and then process the content of the message, there must be a delay defined between the point at which the controller 100 transmits a message and the point in time at which a drive device on the network is expected to use or action the data therein. In the network shown in FIG. 1 this delay is defined as the "Motion Engine Cycle Delay" and is configured to be 500 microseconds. However any suitable length of delay may be implemented, with the intention that the delay will be the calculated maximum time it would take or be permissible for the message to arrive at the respective receiving drive device. This delay may be added to the current time (as defined by an agreed time source, discussed further below) and transmitted as part of the message from the controller 100 as a "process at" time indication, telling the receiving node(s) when to begin processing the message. The "process at" time indication may correspond to the beginning of a motion engine cycle for the receiving device and/or the receiving device may be configured to understand that it should begin process a received message within the next new motion engine cycle that follows the "process at" time indicated in that received message.

At the receiving end, each drive device 102, 104 may be individually configured to use received data at any suitable time. In FIG. 1 the second drive device 104 is configured to use the information received in a message from the controller 100 at the beginning of its next motion engine cycle, immediately after the Motion Engine Cycle Delay time period defined by the controller has lapsed. The first drive device 102 is configured to have a motion engine cycle Offset, wherein it uses the received data 90 microseconds after the beginning of the motion engine cycle that begins immediately after the Motion Engine Cycle Delay defined by the controller 100 has lapsed. Therefore the "process at" time for the same message can effectively be different for the two respective drive devices 102, 104 on the network. Thus the controller 100 can execute fine resolution control that is configured locally to each drive device 102, 104. At the receiving end, each drive device 102, 104 can intelligently select and process a message received from the controller 100 in order to extract data pertinent to itself from that message and to use it if there is a time agreement between itself and the controller 100 as described in more detail herebelow.

The controller 100 shown in FIG. 1 transmits synchronous cyclic frames however it is also possible to use non cyclic frames.

If synchronous cyclic frames are used, the synchronised cyclic data links must use cyclic data frames whose scheme supports synchronised clocks. Furthermore, the format of the messages transmitted must be chosen correctly. FIG. 2a herein shows an example of a non-synchronised cyclic frame. FIG. 2b shows an example of a synchronised cyclic frame. In each of FIG. 2a and FIG. 2b, a representation is given of a sequence of bytes that make up the frame being transmitted. As can be seen from comparison of those two figures, the synchronised cyclic frame includes a block of data inserted between the byte in which the type of scheme is defined and the start of the data content of the frame. This inserted block of data in the synchronised cyclic frame includes information on the time source to which the controller 100 is synchronised, as described in more detail herebelow.

According to an embodiment, messages transmitted on the network shown in FIG. 1 use the IEEE1588 standard format for describing time. The message should be transmitted in packetized form; however they need not be transmitted in accordance with the protocol defined by IEEE1588. Nor do the nodes of the network (which in FIG. 1 comprise the controller 100 and drive devices 102, 104) need to choose a time grandmaster in the manner described by IEEE1588. To the contrary, one or more of the devices on the network can be configured to dictate the time frame for one or more respective other devices on the network at a particular time, as mentioned above.

In order for a transmitting node and a receiving node on the network to communicate successfully, the receiving node must be able to verify that it will be able to make sense of—and accurately follow—the time indications comprised within a message sent by the transmitting node. In order to achieve this, the transmitting node must transmit an indication of the time grandmaster which it has used to generate its time indications, and the receiving node must ensure that it is also synchronised to that same time grandmaster before processing the received message.

Any suitable identification of the time grandmaster may be transmitted by the transmitting node. However the identification should be unequivocal. Therefore the transmitting node preferably transmits a unique identifier associated with its time grandmaster when it transmits a message to the receiving node.

According to an embodiment, the IEEE1588 standard format is used by the transmitting node for describing time. With each message transmitted by the transmitting node, an EUI-64 value is provided to uniquely identify its time grandmaster. This EUI-64 value is represented by way of example in FIG. 2b as the inserted block of data that is not also present in the frame shown in FIG. 2a. When the IEEE1588 standard format is used by the transmitting node, preferably the "process at" indication within the message comprises a 64 bit timestamp, telling the receiving node when to process the data within the message, once the time verification has enabled the receiving node to accept the message.

According to an embodiment, the time grandmaster can be identified as the "network grandmaster clock", which essentially defines a device or other node on the network whose clock others should synchronise to. In such an embodiment, initially when communications begin on a network, the EUI-64 field (i.e. the inserted data block which identifies the time grandmaster for a frame, as shown in FIG. 2b) of the cyclic frame of a transmitting device can identify the local clock of the transmitting device itself, until it has synchronised its local clock with the network grandmaster clock.

The EUI-64 can be generated in any suitable manner. For example, it can be generated from the MAC address (EUI-48) of the time grandmaster device. Using this method for example, MAC address 00:0D:1E:12:34:56 would be 00:0D:1E:FF:FE:12:34:56. The particular manner in which the network grandmaster clock is identified for a particular frame can vary, for example dependent on the MAC address format that is used for particular devices on a network. This will be understood by the skilled reader. More information on conversion of a MAC address to a 64 bit global identifier EUI-64 time indication can be found in the relevant standards document, for example at http://standards.ieee.org/develop/regauth/tut/eui64.pdf.

The use of a unique time master identifier such as a grandmaster clock EUI-64 value is advantageous as it allows verification that the cyclic link source (i.e. the transmitting node) and the destination device (i.e. the receiving node) are both synchronised to the same time source. The destination device will have the EUI-64 identify for the grandmaster clock to which it is synchronised already available and will therefore only have to compare this value with that the EUI-64 data received in the cyclic link data. This comparison can be carried out quickly and easily.

In practice, cyclic data messages may be ignored by the destination device if the source is synchronised to a different grandmaster clock.

The 64 bit timestamp within each cyclic data frame can be used to specify the start of a motion engine cycle in which the data is to be used by the destination device(s). If, as described above in relation to the first drive device 102 in FIG. 1, the data is to be used at an offset into the specified motion engine cycle, then the cyclic link should be configured with the offset information before cyclic data is handled on the receiving device.

The "process at" timestamp within a transmitted message can also be used in non-cyclic communication frames to stipulate a time for the received frame to be processed. For either cyclic or non cyclic communications, on initial evaluation of the timestamp, if the time relates to the future, the message (also known as a "payload") is placed in a buffer along with the timestamp. The "process at" is then periodically evaluated and actioned when the current time corresponds thereto.

Figure 4:
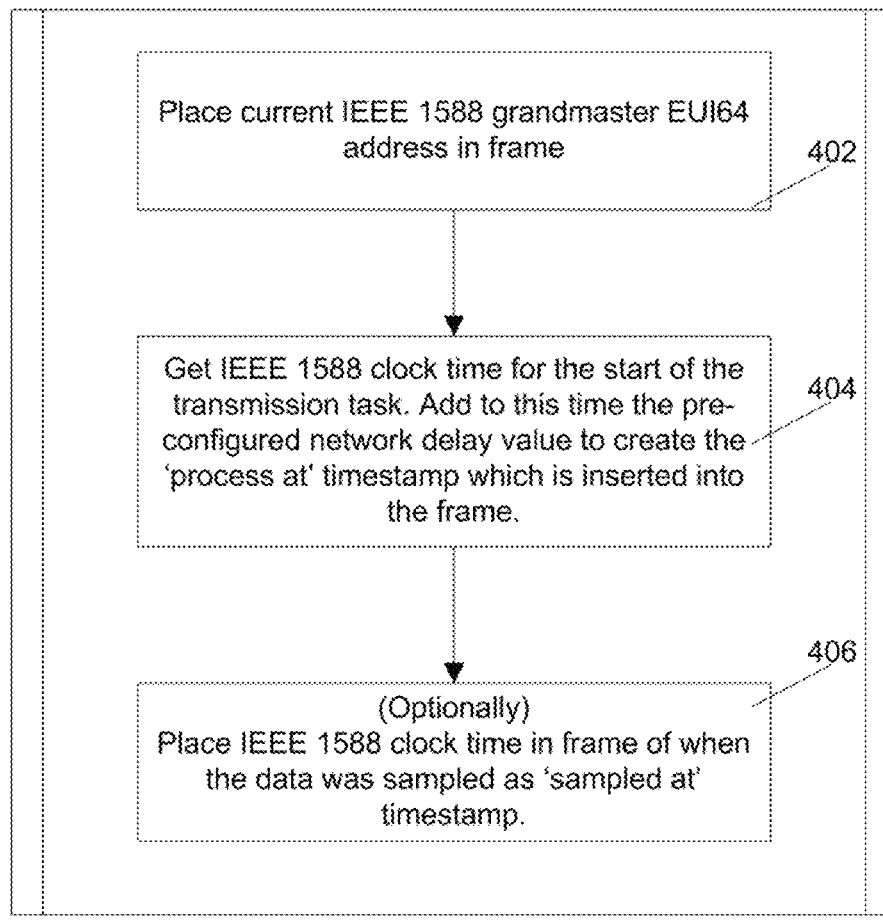
FIG. 4 shows a flow diagram for inserting data fields in a data frame that is to be transmitted according to FIG. 3.

FIGS. 3 and 4 herein show in more detail an example of what can happen at a transmitting device in order to generate and control communications on a network as described herein.

As shown in FIG. 3, at step 302 a transmitting device will be configured to initially determine whether it is time to transmit a message. This may be controlled by the sampling and/or receipt of data at the transmitting device, which must be communicated to other devices, or it may be configured according to a periodic time model. Once it is determined that a message should be transmitted, the transmitting device samples data and constructs a suitable frame at step 304. It then inserts "process at" data fields into the message at step 306 in FIG. 3.

The insertion of the "process at" data fields into the message can be better understood with respect to FIG. 4. As shown at step 402 therein, the transmitting device will place the current IEEE1588 grandmaster EUI-64 address into the frame. It will then obtain the IEEE1588 clock time for the start of the transmission time. It then adds the preconfigured network delay (which allows time for receiving nodes to receive and check the time grandmaster for a message) to this IEEE1588 clock time for the start of the transmission time, which generates the "process at" timestamp, which is inserted into the frame at step 404. Step 406 is then an optional further step, wherein the IEEE1588 clock time for when the data was sampled can also be inserted into the frame as a "sampled at" timestamp.

Referring again to FIG. 3, once the insertion of the "process at" and "sampled at" data fields has been completed; the transmitting node can transmit the frame at step 308. It will then wait until the next transmit period 310 before transmitting again.

Figure 5:
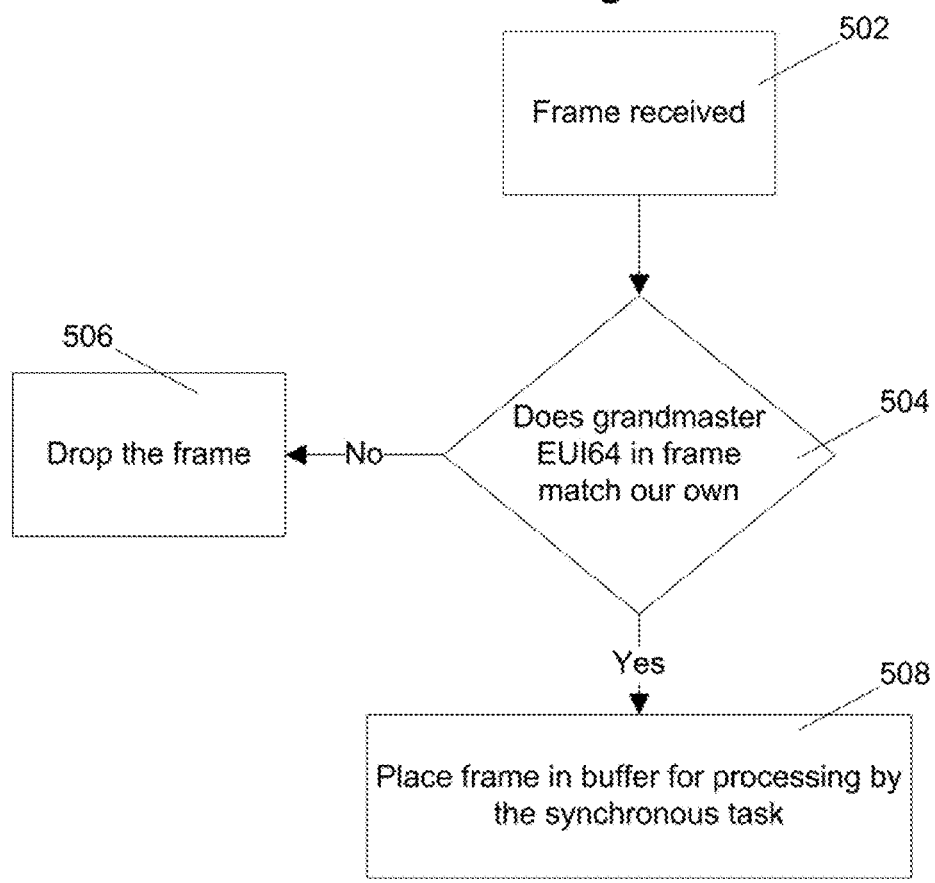
FIG. 5 shows a flow diagram for receiving a cyclic data frame.
Figure 6:
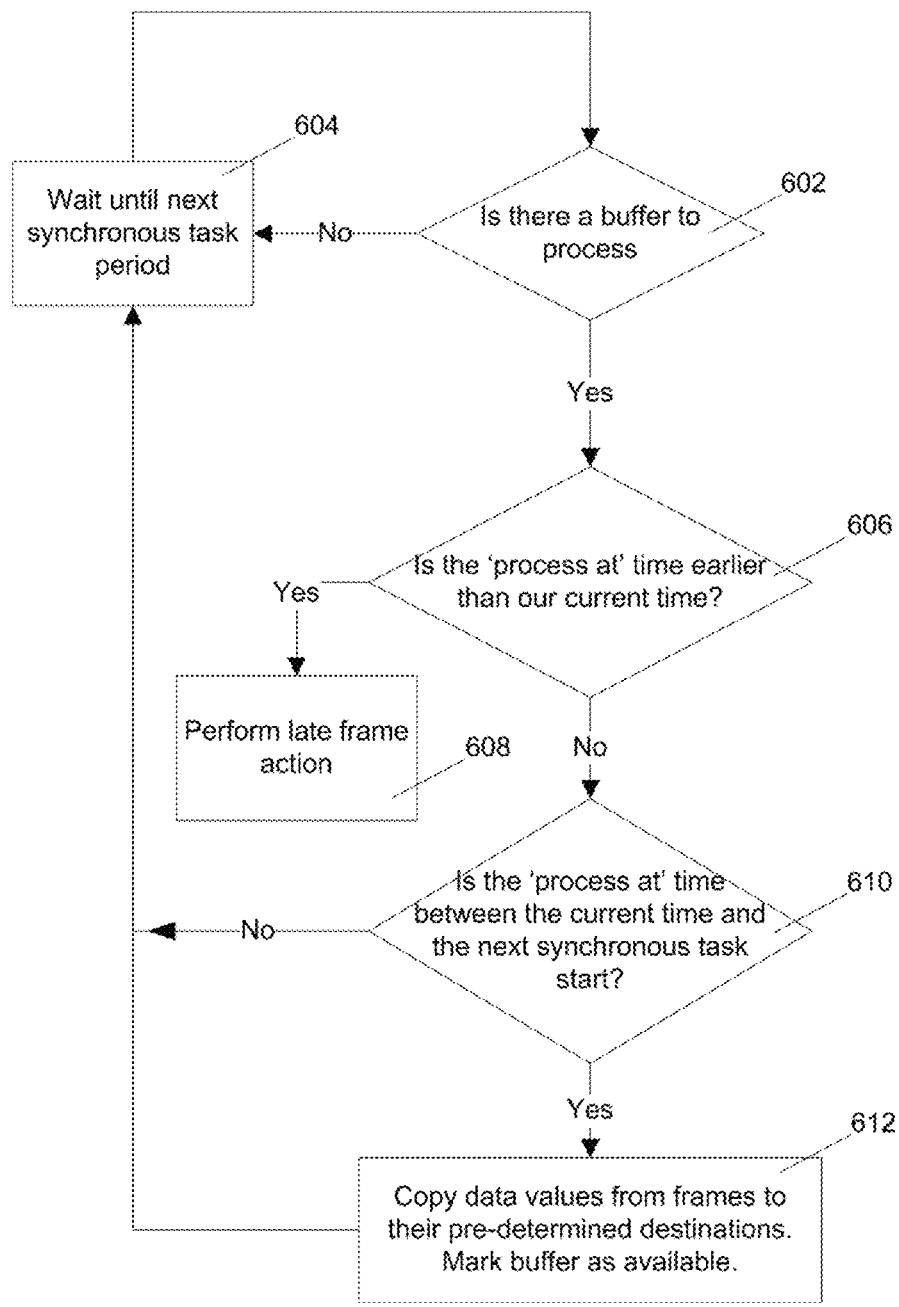
FIG. 6 shows a flow diagram for synchronous processing of a data frame that has been received according to FIG. 5.

FIGS. 5 and 6 herein show in more detail an example of what can happen at a receiving device in order to receive and action communications on a network as described herein.

As mentioned above, the receiving device can ideally receive messages at any time during its operation. Each device will have an inherent update period or refresh time, after which it will look for more data, as is well known. This period referred to as a "motion engine cycle" in relation to FIG. 1, discussed above. When a frame is received, shown as step 502 in FIG. 5, the receiving device will check 504 if the grandmaster EUI-64 address in that frame matches the grandmaster EUI-64 address stored for itself. If it does not, the frame is dropped 506 and so the message is discarded. If there is a match, the frame is usually placed in a buffer to await processing as shown in step 508. This processing is performed as a synchronous task, meaning that the message is processed at the receiving end at a time—or within a time interval—which is dictated by the "process at" timestamp in the received message. This is detailed in FIG. 6.

As shown in FIG. 6, the receiving device will first check 602 if there is a buffered message to process at all. If there is not, it waits a predetermined amount of time 604 before checking again. The time period for which the receiving device waits between checks is defined in FIG. 6 as being a "synchronous task" time interval.

If it is identified that there is a buffered message present, the receiving device must then determine whether the "process at" timestamp for that buffered message is within the current "synchronous task" time interval. If the "process at" time defined in the message corresponds to a time that has already passed, as determined at step 606 in FIG. 6, the message will have to be actioned immediately as a late action 608. If on the other hand the "process at" time defined in the message corresponds to a time that corresponds to the current time (or to the current "synchronous task" time interval), or to a time between the current time and the beginning of the next synchronous task time interval at the receiving device 610, the buffered message will be actioned. This actioning 612 comprises copying data from the frames of the received and buffered message to their predetermined destinations at the receiving end. Once this has been done, the buffer can be marked as available for buffering a new message. Any suitable number or arrangement of buffers can be provided at the receiving end, so that multiple received messages may be stored at the same time.

Referring back to FIG. 6; in other cases, the receiving device will determine that the buffered message should not be processed yet and it waits 604 for the next synchronous task interval to begin before taking any action.

The method of communicating between nodes on a network has been described hereabove as being pertinent to, for example, drive devices. Whilst the communication is not limited to being between drive devices, or to being between a drive device and a controller, FIG. 7 herein shows a schematic representation of one type of drive device that could communicate on a network using the method described hereabove.

The drive device (referred to hereinafter as a "drive" 700) is delineated in FIG. 7 using a dashed line to separate the components that may be comprised within the main body of the drive 700 from those that may be provided on an external surface thereof and/or externally connected thereto. However the skilled reader will appreciate that any suitable physical arrangement of the component parts shown in FIG. 7 may be implemented.

Figure 7:
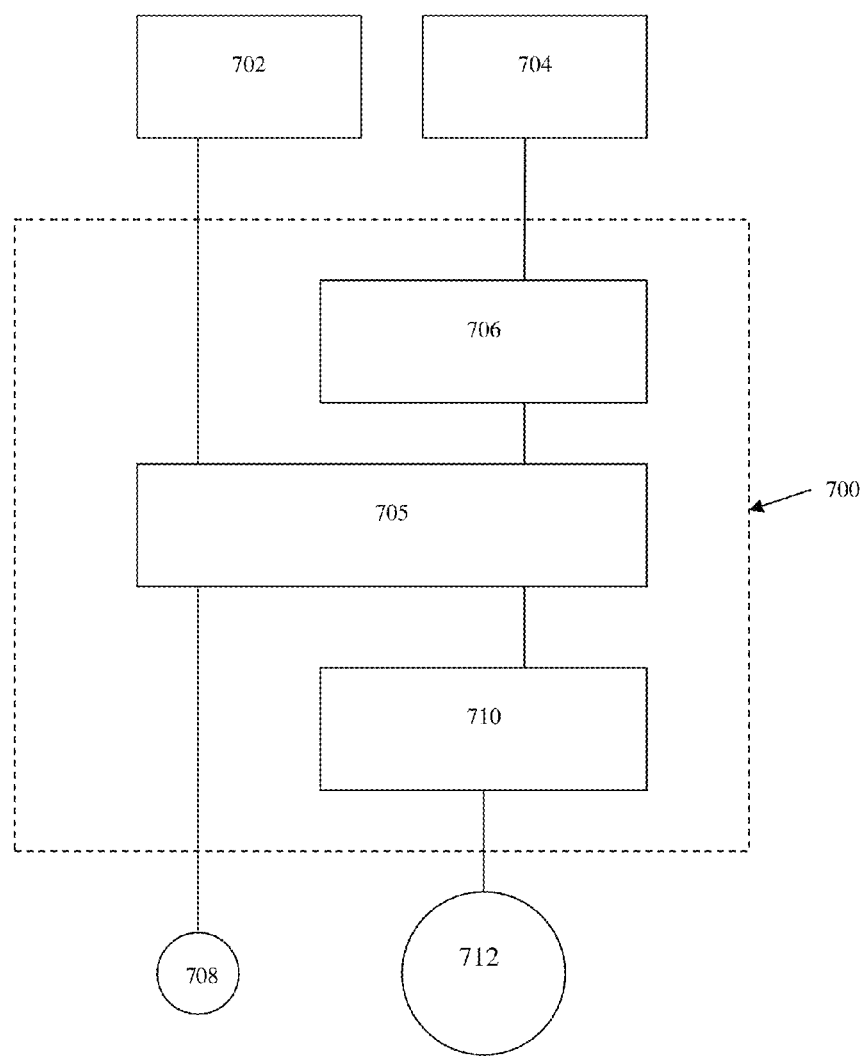
FIG. 7 is a schematic representation of a drive device.

The drive 700 shown in FIG. 7 includes a display 702 on an external surface thereof. It is not essential for a drive to have such a display and in some embodiments it may be omitted. When it is included, the display 702 provides a communication pathway between the user and control circuitry 705 that is comprised within the drive 700, as discussed further below. The display 702 can include features such as a graphical user interface (GUI) and/or a user input mechanism such as a touch screen or hardwired buttons for the user to actuate to provide input to the drive 700.

Other options 704 may interface with the components within the drive 700. These options 704 are generally for the purpose of extending the functionality of the drive. For example they can provide communication links and/or programmable logic control (PLC) functionality. The options 704 may additionally or alternatively include an input/output device and/or a feedback module for example connected to an encoder.

Within the drive 700 there is a memory 706, usually a shared memory, which enables any options 704 to communicate with the rest of the drive 700. As mentioned above, the drive further comprises control circuitry 705 which acts as the processor for the drive 700. The control circuitry 705 will usually have its own ROM and RAM and can communicate with external devices such as an encoder 708. The functionality and operation of an encoder 708 will be well known to the skilled person and so will not be described further herein.

Within the drive 700 there is also power circuitry 710 which is in communication with the control circuitry 705. The control circuitry 705 will generally be arranged to transmit signals to the power circuitry 710 in order for it to control operation of a motor 712 that is connected to the drive 700. The power circuitry 710 is generally responsible for transmitting signals to the motor 712. For example it may switch low voltage signals to high power switching in order to drive rotation of the motor 712.

As mentioned above, the arrangement shown in FIG. 7 and described herein is only an example of a drive device. Any suitable drive device, and indeed a wide range of other devices, may be configured to communicate on a network as described in detail herein. Furthermore, as the skilled reader will be aware, the particular components that make up and/or interface with a drive may vary according to a range of factors such as its intended use, any physical constraints for the drive device and the type of network into which it is to be incorporated.

Figure 8:
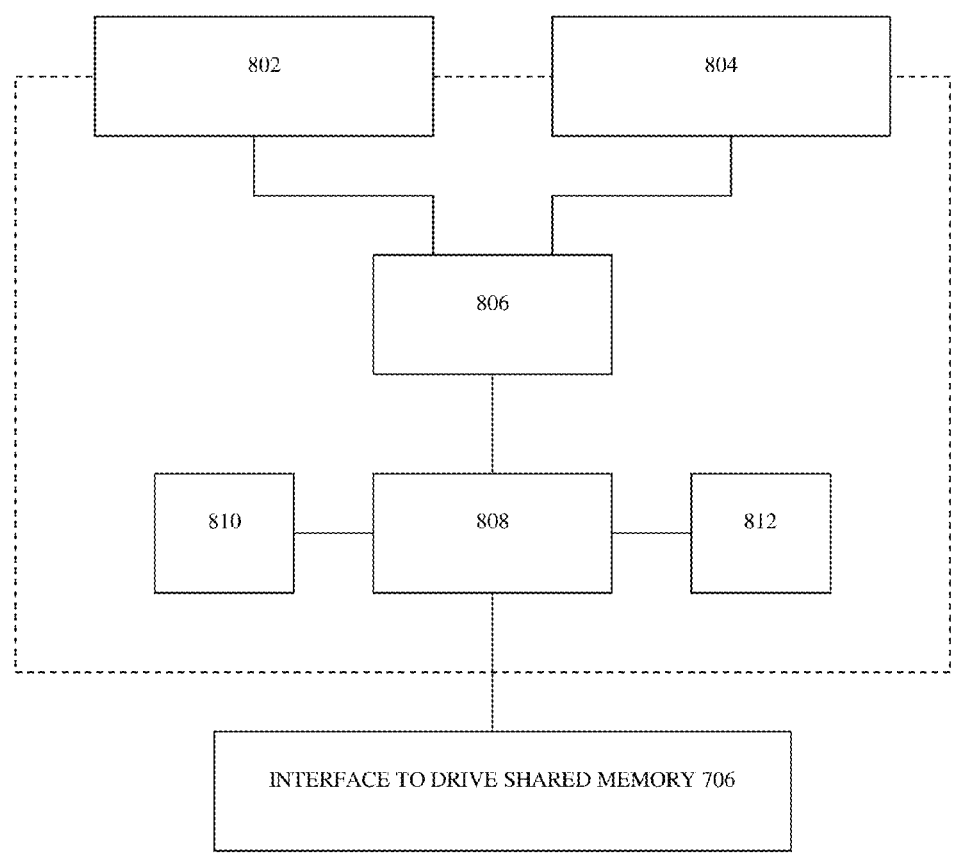
FIG. 8 is a schematic representation of an option that can communicate with the drive device of FIG. 7.

FIG. 8 shows an example of one possible option 704 that may be provided as part of, or in conjunction with, a drive 700 such as the one shown in FIG. 7 herein.

The option 704 shown in FIG. 8 is provided to assist with network communications for the drive 700. It comprises first 802 and second 804 network interfaces that act as external connections to the rest of the network. For example the first 802 and second 804 network interfaces may comprise Ethernet ports. A switch 806 is also provided. For example this may be a standard Ethernet switch or any other suitable type of switch. The switch 806 communicates with a processor 808 which in turn interfaces with the shared memory 706 within the drive 700. The processor 808 preferably has its own dedicated RAM 810 and ROM 812. Alternatively, other memory arrangements may be provided. In the arrangement shown in FIG. 8, the switch 806 provides IEEE1588 hardware support to the processor 808, to facilitate the handling of communications between the network and the drive 700.

Alternatively, the switch 806 may have no hardware support, in which case the processor 808 would have to handle all such communications itself. This is possible but may lead to an impairment of accuracy in data transmission between the network and drive 700.

Although the option 704 in FIG. 8 has been described hereabove as comprising Ethernet ports and including a switch 806 that provides IEEE1588 hardware support, the method of communicating as described herein is not limited to Ethernet or to IEEE.

When a device such as the drive 700 depicted and described in FIGS. 7 and 8 herein interfaces with other nodes on a communications network, the method of communication described herein can enable it to communicate as a controller and/or as a drive in the conventional sense. That is, as the skilled reader will be aware, in typical network set up where there is a central controller communicating with one or more drive devices, the controller will typically send command data to the drive device(s), wherein that command data comprises set point values or command values. Once drive device has received the command data from the controller, it will provide feedback data to the controller wherein that feedback data includes actual values. The transmission of the feedback data by the drive device is triggered by, and dependent on, the receipt at the drive device of command data.

In contrast, the communication method described herein does not rely on the receipt of command data by a receiving device in order for it to provide feedback data. Nor does it limit a single device to sending either command data or feedback data. Instead, as will be appreciated from the detailed description in relation to FIGS. 1 to 6 hereabove, when the communication method provided herein is implemented on a network, one device can act as a transmitting node and send command data to a second device acting as a receiving node. The receiving node is not required to immediately respond, or indeed to respond at all, although it may do so in some embodiments.

Importantly, the messages transmitted according to the communication method described herein can be uni-directional messages. Their transmission can be triggered according to a timing model, not by the receipt at any one node of a message from any other node. For example, again as described in detail hereabove, a device can be configured to issue command data periodically, for example every 250 nanoseconds. Furthermore a device may be configured to send feedback data periodically and/or it may be configured to send feedback data based on a "process at" time.

The communications between two devices on the network may be configured to be cyclic but each individual message will still be issued based on a time, not based on the receipt of a message from the other respective device. Furthermore, any single device can issue command data or feedback data or both.

Figure 9:
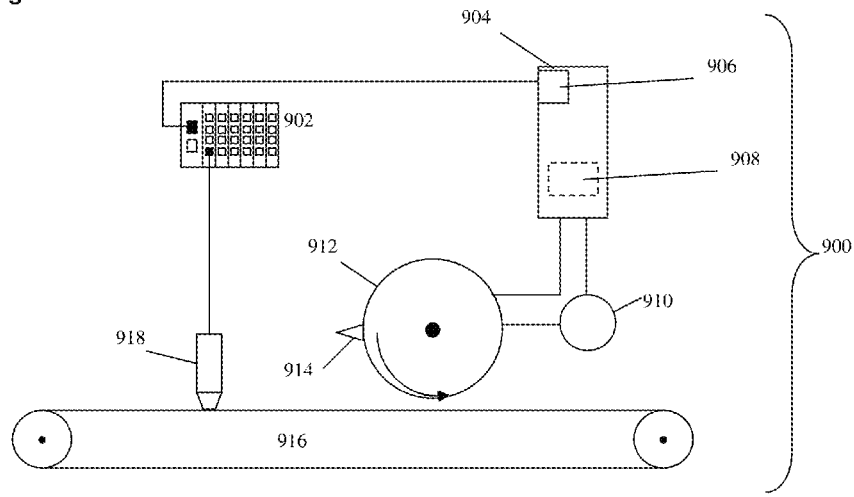
FIG. 9 shows a drive device in use driving a rotary knife drum.
Figure 10:
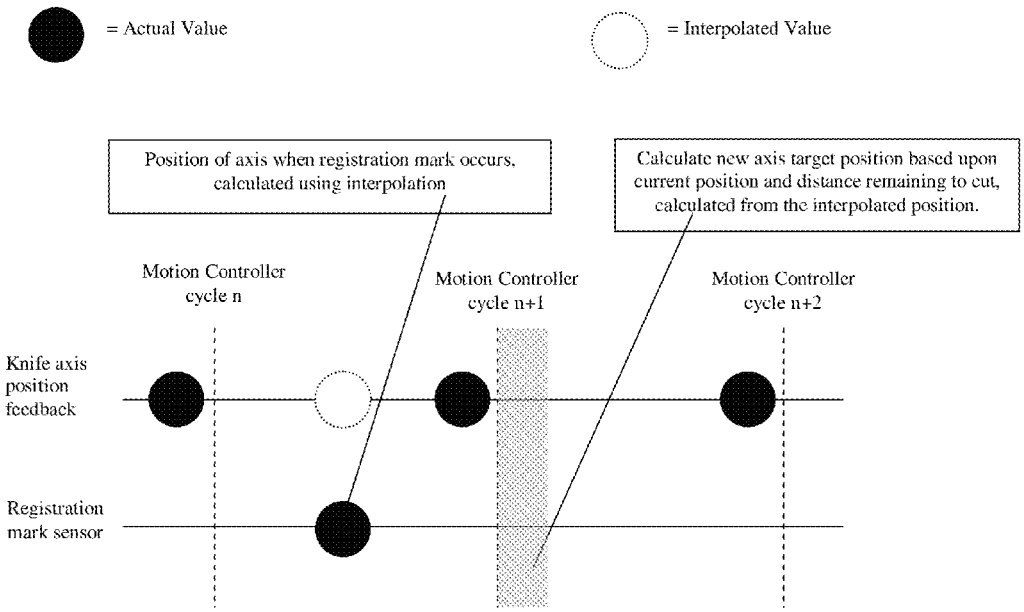
FIG. 10 shows an example of interpolation for the set up shown in FIG. 9.

As discussed in detail in relation to FIGS. 1 to 6 herein, each message sent by a transmitting node on a network operating according to the communications method as described herein will preferably include a "process at" time, which is an indicator of the time at which the receiving device should action the content of the message, once that receiving device has verified that it is synchronised to the same time source as the transmitting device is. Furthermore, a message transmitted by the transmitting device can include a "sampled at" time which is an indicator of the time at which the message was assembled at the transmitting end and/or an indication of the time at which data contained within the message was obtained, for example using a sensor, logging device or processor. FIGS. 9 and 10 herein illustrate a possible use of the "sampled at" time for a networked system. This example is illustrative only and is not intended to be limiting.

In FIG. 9 a system 900 is shown wherein that system 900 comprises a network input/output (I/O) device 902 in communication with a drive inverter device 904 (referred to hereinafter as a "drive"). The drive 904 includes a network interface 906 and in the embodiment shown in FIG. 9 also includes a PLC programme 908. The drive 904 communicates with an encoder 910 which is connected to a motor (not shown) that drives a rotary knife drum 912 that includes a knife 914. The drive 904 must issue signals to control rotation of the rotary knife drum 912 in order for the knife 914 to cut material provided on a conveyor belt 916 therebelow at a specified time.

The system 900 in FIG. 9 further comprises a sensor such as an optical registration marker sensor 918 (referred to hereinafter as the "sensor" 918). The sensor 918 is configured to scan or otherwise check material that passes thereunder, along the conveyor belt 916, and to recognise a particular registration marker or markers. When such a registration marker is sensed by the sensor 918, it will issue a signal indicative of this to the networked I/O device 902. In turn, the networked I/O device 902 transmits a signal to the drive 904 telling it that the registration marker has been sensed, which prompts the drive 904 to prepare the rotary knife drum 912 to cut the material at a specified time. The message sent by the networked I/O device 902 to the drive 904 includes a "sampled at" time stamp which is an indication of the time at which the sensor 918 sensed the registration marker. As described further in relation to FIG. 10 herebelow, the "sampled at" time stamp can be used by the drive 904 for interpolation or extrapolation purposes in order to accurately control operation of the rotary knife drum 912.

The position of the central rotational axis through the centre of the rotary knife drum 912 is fixed in FIG. 9. The knife 914 is fixed to the rotary knife drum 912 such that, when the rotary knife drum 912 rotates, the rotational position of the knife 914 changes. According to an embodiment, when the rotary knife drum 912 is in a rotational position such that the knife points substantially vertically downwards from the central rotational axis of the drum, the knife 914 can cut the material on the conveyor belt 916 thereunder.

The rotary knife drum 912 can rotate at a range of speeds, under the control of the drive 904. According to an embodiment, the drive 904 cams rotation of the rotary knife drum 912 in order for it to rotate relatively slowly when no cuts need to be made by the knife 914 within a predefined upcoming time period. It can then speed up rotation of the rotary knife drum 912 when it is determined that a cut is required, in order to ensure that the knife 914 is in position for the cut at the correct time.

The sensor 918 is preferably also fixed, such that the distance (measured along the conveyor belt 916) between the sensor 918 and the central rotational axis of the rotary knife drum 912 will be fixed and will be known to the drive 904. This distance should be large enough so that, based on the speed of movement of the conveyor belt 916 (at the relevant time), there is sufficient time for: the sensor 918 to communicate with the I/O device 902; the I/O device 902 to send to a message to the drive 904; the drive 904 to check and verify that message before processing it; and the drive 904 to control rotation of the rotary knife drum 912 in accordance with the processed message, before the time at which the knife 914 needs to cut the material on the conveyor belt 916.

The speed of the conveyor belt 916 at a particular time will be known to the drive 904. The rotational speed of the rotary knife drum 912 at a particular time will also be known to the drive 904 and the encoder 910 can be used to obtain position feedback on the rotational position of the knife 914, for example at periodic intervals. All this information can be used by the drive 904 to calculate, for example using interpolation, a target position for the knife 914, wherein the target position would ensure that the knife 914 will cut the material on the conveyor belt 916 at the correct time, and to control operation of the rotary knife drum 912 accordingly. This can be understood further in relation to FIG. 10 described below.

In FIG. 10 a number of actual values and an interpolated value are shown over the course of three "motion controller cycles". A single "motion controller cycle" is equivalent to the "motion engine cycle" or inherent drive update period described above in relation to preceding figures. As shown in FIG. 10, the encoder 910 can be used to determine a "knife axis position" for the rotary knife drum 912 just before the beginning of a new motion controller cycle. This "knife axis position" in FIG. 10 refers to the rotational position of the knife 914, as described above in relation to FIG. 9.

When a registration marker is sensed by the sensor 918 during a particular cycle (cycle "n" in FIG. 10), the drive 904 can use the knife axis position at the end of the preceding motion controller cycle and the knife axis position at the end of the current motion controller cycle in order to calculate the position of the knife axis at the "sampled at" time, at which the registration marker was sensed, using interpolation. Alternatively, the drive 904 could use knife axis position data from two previous motion controller cycles to calculate the position of the knife axis at the "sampled at" time using extrapolation.

Once it has calculated the position of the knife axis at the relevant time (i.e. at the "sampled at" time), the drive 904 can use this information in order to calculate a new knife axis target position. It uses this to control movement of the rotary knife drum 912—in particular, its speed of rotation—so that the knife 914 will be in position to cut the material on the conveyor belt 916 at the correct time, and therefore at the correct point on that material.

The interpolation calculation may be carried out by the inherent control circuitry within the drive 904 or (more likely) it may be carried out by the PLC programme 908. In either case, the "sampled at" time stamp can be used by the drive 904 in order to accurately and quickly determine how the rotary knife drum should be controlled and to exert that control accordingly. Before looking at the "sampled at" time or taking any other action with respect to a message received from the networked I/O device 902 in FIG. 9, the drive 904 would first ensure that it is synchronised to the same time grandmaster as the networked I/O device 902 is synchronised, as described in detail hereabove.

The method of communication described herein can be used in a wide range of implementations. It can be employed on a network having any number of nodes, wherein those nodes comprise any suitable apparatus such as a switch, device, controller or processor. There is no need for every node in the network to be synchronised with one another in order for two of those nodes to communicate. Instead, all that is needed is an agreement between the two communicating nodes on the time grandmaster to which they are synchronised. The "synchronisation" may comprise a time grandmaster controlling one or more time values at the respective node exactly, or to within a pre-determined tolerance limit.

The processing of a message at the receiving end should be controlled according to a "process at" indication within the received message. That "process at" indication may comprise a time stamp or any other suitable indication. The time frame employed to determine the time at which the receiving end should process the message need not be a real world time. Instead it can be any suitable time frame as long as the epoc for the time frame is known and the relative time at which the receiving end should process the message is clear.

The particular examples discussed herein relate to Ethernet however the method of communication can be implemented on non-Ethernet devices. If Ethernet is used, any suitable carrier may be used. However the method does not rely on Ethernet and may be implemented in a wide range of other communication set-ups, including existing technologies and future technologies.

Particular examples described herein employ aspects of the IEEE standards such as IEEE 1588. However the method does not require the use of IEEE. For example, an alternative protocol such as network time protocol (NTP) could be used.

The method of communicating as described herein and the devices or networked system that employ such a method enable accurate and reliable communication between nodes on a network, for example between devices such as drive devices and/or between a drive device and a controller. The method does not rely on complete synchronisation across the network but on a clear agreement between two communicating nodes on the time grandmaster to which they are synchronised before the receiving node is allowed to process the received message. The step of checking at the receiving end whether the time source to which it is synchronised is the same as the time source to which the node at the transmitting end is synchronised can be quick and straightforward and can also be computationally non-intensive. Therefore a highly useful, accurate and reliable solution is provided.

Whilst particular examples are described and illustrated herein, these are not intended to be limiting.

The invention claimed is:

1. A network communication method, said network comprising first and second nodes, the method comprising:
   transmitting a message from the first node to the second node, wherein the message comprises a data content portion and an identifying portion, wherein said identifying portion includes a first unique identifier corresponding to a time source which controls a time value at the first node;
   receiving the transmitted message at the second node;
   comparing the first unique identifier to a second unique identifier, wherein said second unique identifier corresponds to a time source which controls a time value at the second node; and
   if the result of said comparison is positive, accepting the message for processing at the second node.

2. A method as claimed in claim 1 wherein the first node is synchronised to the time source which controls a time value at the first node, and/or wherein the second node is synchronised to the time source which controls a time value at the second node, and optionally wherein a node is deemed to be synchronised to a time source if a reference time used at the respective node matches a corresponding reference time at the time source to within a predetermined tolerance limit.

3. A method as claimed in claim 1 wherein the first and second nodes form part of a networked system and wherein said first unique identifier and/or said second unique identifier is unique within said networked system.

4. A method as claimed in claim 1 wherein said first unique identifier and/or said second unique identifier is a globally unique identifier.

5. A method as claimed in claim 1 wherein said comparison step is carried out at the second node.

6. A method as claimed in claim 1 wherein the result of the comparison is deemed to be positive if the first unique identifier is found to be identical to the second unique identifier, and optionally wherein the first unique identifier is found to be identical to the second unique identifier if the two identifiers match one another to within a predetermined threshold.

7. A method as claimed in claim 1 wherein the step of accepting the message for processing at the second node includes placing the message in a buffer for future processing.

8. A method as claimed in claim 1 wherein the step of accepting the message for processing at the second node comprises processing the message immediately once the result of the comparison has been deemed to be positive.

9. A method as claimed in claim 1 wherein the second node comprises a device having a repeating update period, and wherein the method further comprises processing the message at the second node at the beginning of a new update period.

10. A method as claimed in claim 1 wherein the second node comprises a device having a repeating update period, and wherein the method further comprises processing the message at the second node at a predetermined time after the beginning of a new update period.

11. A method as claimed in claim 1 wherein the transmitted message includes a processing instruction, wherein said processing instruction includes an indication of a processing time at which the second node should process the message if the result of the comparison is positive, and optionally wherein the second node comprises a device having a repeating update period and wherein the indication of a processing time at which the second node should process the message comprises a time interval from the beginning of an update period.

12. A method as claimed in claim 1 wherein the data content portion of the message includes a sampling indication, said sampling indication comprising a time at which sampled data within the data content portion was obtained, and optionally wherein said sampled data was obtained by any of: a sensor, a logging device, or a processor, and optionally said sampling indication comprising the step of using the sampling indication to obtain a data value for use by the second node using one of: interpolation or extrapolation.

13. A method as claimed in claim 1 wherein the first and second nodes communicate with one another using an Ethernet-based protocol.

14. A method as claimed in claim 1 wherein the first unique identifier and/or the second unique identifier comprises a unique network address for a device having a local clock, wherein said local clock comprises the time source which controls a time value at the respective node.

15. A method as claimed in claim 1 wherein the time source which controls a time value at the first node and/or the time source which controls a time value at the second node comprises a local clock at the first node or a local clock at the second node.

16. A method as claimed in claim 1 wherein the network comprises a third node and the time source which controls a time value at the first node and/or the time source which controls a time value at the second node comprises a local clock at the third node.

17. A method as claimed in claim 1 wherein the network further comprises a third node having a third unique identifier associated therewith, wherein said third unique identifier corresponds to a time source which controls a time value at the third node, and wherein said third unique identifier is different to the first unique identifier and/or to the second unique identifier.

18. A method as claimed in claim 1 wherein, if the result of said comparison is negative, the second node discards the message.

19. A method as claimed in claim 1 wherein the step of processing the message comprises copying data from the data content portion of the message to one or more data destinations at the second node.

20. A device arranged to communicate with one or more other devices on a network, wherein said device is configured to operate as a first node or as a second node on the network, the device including a controller configured to receive a transmitted message, the message comprising a data content portion and an identifying portion, said identifying portion including a first unique identifier corresponding to a time source which controls a time value at the first node; compare the first unique identifier to a second unique identifier, said second unique identifier corresponding to a time source which controls a time value at the second node; and if the result of said comparison is positive, accept the message for processing.

21. A device as claimed in claim 20 wherein the result of the comparison is deemed to be positive if the first unique identifier is found to be identical to the second unique identifier, and optionally wherein the first unique identifier is found to be identical to the second unique identifier if the two identifiers match one another to within a predetermined threshold.

22. A device as claimed in claim 20 wherein the controller is configured to place the message in a buffer for future processing.

* * * * *